Feb. 16, 1965     H. E. ZAHN     3,169,889
STORAGE BATTERY CELL AND METHOD OF MAKING THE SAME
Filed Sept. 24, 1962
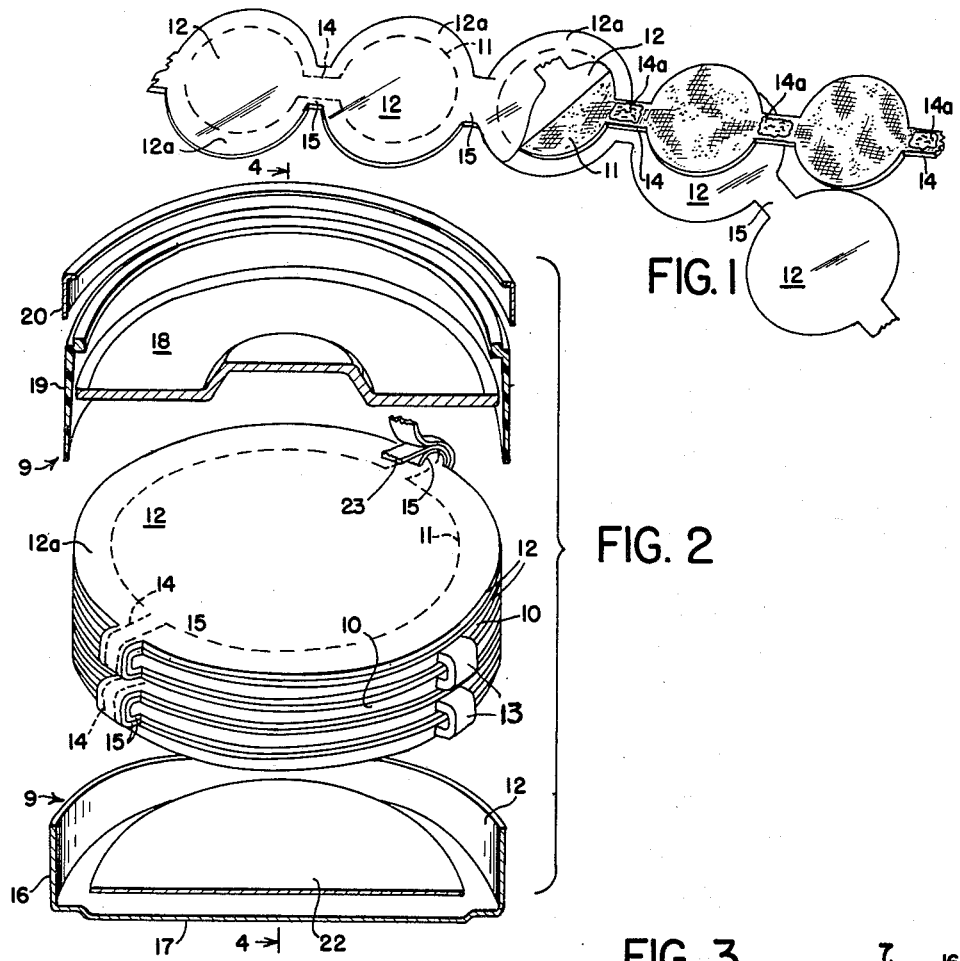
FIG. 1
FIG. 2
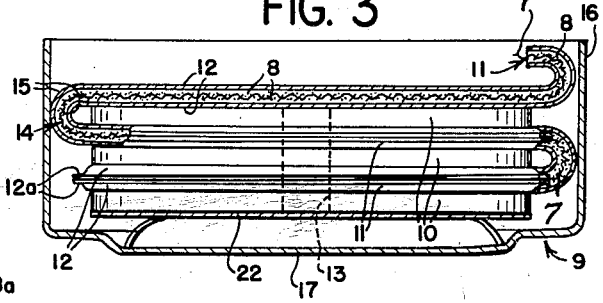
FIG. 3
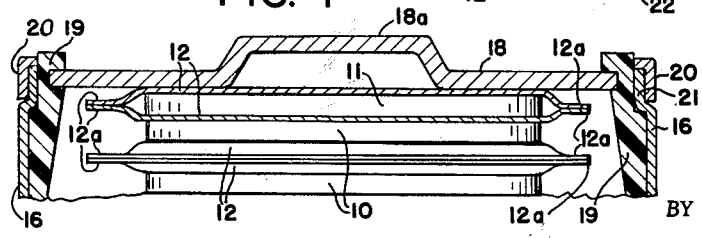
FIG. 4
INVENTOR.
HAROLD E. ZAHN
BY John E. Stryker
ATTORNEY

United States Patent Office 3,169,889
Patented Feb. 16, 1965

3,169,889
STORAGE BATTERY CELL AND METHOD OF MAKING THE SAME
Harold E. Zahn, Edina, Minn., assignor to Gould-National Batteries, Inc., a corporation of Delaware
Filed Sept. 24, 1962, Ser. No. 225,471
2 Claims. (Cl. 136—6)

This invention relates to improvements in battery cells, and particularly to cells of the sealed alkaline type wherein the electrodes comprise sintered plaques disposed in a stack.

Among the objects of my invention are to improve the efficiency, prolong the life and reduce the cost of cells of this type by novel construction and arrangement of the electrodes, integral connectors and enveloping separators.

Particular objects are to provide in a cell of the class described, interplate connectors which reduce internal cell resistance, affording short, high conductivity electrical paths between plates, and to provide interconnected separators affording more reliable insulation against shorting within the cell.

A further object is to provide a method of fabricating cells of the class described which includes the preassembly of a set of the electrodes of at least one polarity with precisely positioned separators secured thereto, thereby reducing the number of parts which must be handled in the final assembly and facilitating precise uniform location of the separators whereby to minimize short circuiting and increase the cell life.

Other objects and advantages of the invention will appear and be more fully pointed out in the following specification and claims.

Referring to the accompanying drawing which illustrates, by way of example and not for the purpose of limitation, a preferred embodiment of my invention:

FIGURE 1 is a schematic perspective view showing a subassembly of electrode plates with connecting portions and separators;

FIG. 2 is a part sectional view and part assembly view, in perspective, of a typical assembly of the cell elements in spaced relationship to the casing members;

FIG. 3 is a cross sectional view of the lower portion of the casing and an assembly of electrodes and separators therein, partially in section, and FIG. 4 is a central vertical sectional view through the upper portion of the casing of a sealed cell embodying the invention.

The illustrated cell is of the sealed alkaline storage battery type having positive and negative plates of the sintered electrode type. As shown in FIG. 3 each set of plates has a thin, porous screen or foil conductor 7 covered on both sides with layers 8 of sintered metal and die cut to fit in a substantially cylindrical casing indicated generally at 9. Negative electrodes 10 and positive electrodes 11 of generally circular shape are adapted to be stacked in the casing 9 with separators 12 formed from suitable porous sheet material.

The negative electrodes 10 are connected by integral relatively narrow portions 13, and the positive electrodes 11 are similarly connected by integral relatively narrow portions 14 of a one piece strip of sintered plaque comprising the supporting screen 7 and sintered layers 8 of metal powder. A pair of the separators 12 are shaped to overlie opposite surfaces of the plates of one polarity and include connecting portions 15 which overlie opposite sides of the portions 14 of the plates of the same polarity in a sub-assembly, such as that shown in FIG. 1. A coat of a suitable adhesive is applied between the portions 15 and underlying surfaces of the portions 14 of the electrodes as indicated at 14a in FIG. 1. Marginal portions 12a of the separators 12 project at both sides of the plate portions 14 and at the peripheries of the plates 11. The projecting marginal portions 12a of the separators enclose the positive plates 11 and are preferably heat sealed or cemented together so that the plates of at least one polarity in the stack are retained in spaced relation to the cell casing and effectively insulated from the several plates of opposite polarity.

As shown in FIGS. 2 and 3, the casing for the cell includes a cylindrical wall 16, an integral bottom wall 17, a generally circular cover 18, an annular hard plastic gasket 19 and a reinforcing ring 20. When the cell is closed and sealed, as indicated in FIG. 4, the ring 20 confines the gasket 19 under radial compression between the periphery of the cover 18 and upper rim 21 of the cylindrical casing wall 16. The assembly may also include a resiliently supported disk 22 (FIGS. 2 and 3) adapted to make contact with the lowermost negative electrode 10 and a terminal tab 23 projecting from the uppermost positive plate 11 and welded or heat fused to the lower side of the cover 18 in the finished cell.

In fabricating the cell, a sub-assembly such as that shown schematically in FIG. 1 is made by applying a suitable adhesive to areas such as those indicated at 14a to both surfaces of the portions 14 and then placing a pair of the strips of separator material 12 with their narrow portions 15 in overlapping relation to the upper and lower adhesive coated surfaces 14a so that the separators are secured in properly centered relationship to the several plates, with the margins 12a of the separators projecting uniformly at the peripheries of the electrodes. The projecting margins 12a may also be adhesively secured together or heat sealed together to completely enclose the several circular plates 11 of the set in electrolyte-pervious envelopes.

As the next step in the fabricating procedure the subassembly of plates and separators so formed is folded crosswise of the several portions 14 and their enclosing portions 15 of the separators in the accordion pleated arrangement, best shown in FIG. 3. The plates 10 of opposite polarity are similarly folded crosswise of their connecting portions 13 and the several plates 10 are inserted between the separators of the sub-assembly, with the connecting portions 13 projecting from the stack at a radial angle to the folded portions 14 and covering separator portions 15, as best shown in FIG. 2.

The resulting assembly of plates and separators may be arranged, as indicated in the drawing, with a negative plate at the bottom of the stack for contact with the spring member 22 of the casing and with the terminal tab 23 projecting from the topmost positive plate for connection with the cover 18 of the casing. A measured quantity of suitable liquid electrolyte is charged into the casing prior to the closing and sealing operation. The assembled plates and separators are placed within the cylindrical wall 16 of the casing on the spring supported member 22, the tab 23 is welded to the bottom side of the cover 18, and the latter is assembled with the gasket 19 and reinforcing ring 20 in closed position within the upper rim 21 of the cylindrical casing wall 16.

A press having dies adapted to exert radial compressive force inwardly on the reinforcing ring 20 is used in the final closing and sealing operation. In order to provide a permanent seal which will withstand thermal shock and high internal pressures in the cell, the cover 18 and reinforcing ring 20 are formed from steels having high tensile strength, and the gasket 19 is formed from a hard plastic material of which nylon, sold under the trademark "Zytel," is an example. After the compressive force is removed from the container, the gasket 19 and cover 18 will exert radial compressive force outwardly against the container wall 16 and reinforcing ring 20 sufficient to maintain a permanent seal. For the radial sealing of the cell, a sizing die of smaller diameter than the wall 16 may be used so that the upper marginal portion 21 of the wall 16 is offset radially inward with the outer surface of the ring 20 flush with the outer surface of the cylindrical wall, as indicated in FIG. 4.

It will be evident that the integral portions 13 and 14 of the sintered electrodes provide short high conductivity, electrical paths between the electrodes of each set and thereby reduce internal cell voltage drop. By providing a sub-assembly, such as that shown in FIG. 1, I insure complete isolation of the electrodes of one polarity in separator envelopes which may be easily folded to provide stacks of plates of uniform diameter adapted to fit readily into casings of predetermined width or diameter. Further economy and improved uniformity is obtained by making it unnecessary to handle and properly center a multiplicity of thin flexible separator disks in the final assembly in cell casings of the type described.

I claim:
1. A sealed alkaline storage battery cell comprising, a sealed casing, sets of positive and negative electrode plates within said casing, an integral relatively narrow portion of each positive plate connecting it to another positive plate of the same set, an integral portion of each negative plate connecting it to another negative plate of the same set, a pair of separators each comprising a sheet of porous material separating surfaces of said positive and negative plates, interconnecting integral portions of said separators folded over and covering opposite surfaces of each of said integral portions of the plates of at least one of the sets of plates, said separators having marginal portions projecting outwardly toward said casing from the edges of said plates, said marginal portions being sealed to one another along their opposite facing surfaces thereby completely enveloping said at least one set of plates, and means securing said interconnecting portions of said separators to the underlying surfaces of the several integral narrow portions of said one of said sets of plates.

2. A method of fabricating a storage battery cell having a casing which comprises:
   (a) forming sets of positive and negative electrode plates adapted to fit in a stack in said casing and each having a thin porous conductor sheet, a continuous relatively thick layer of sintered metal powder carried by said sheet and an integral relatively narrow connecting portion integral with a plate of the same polarity;
   (b) forming sheets of porous separator material of size and shape adapted to cover the opposed surfaces of said positive and negative plates including the integral relatively narrow connecting portion of a first one of said sets of plates; said sheets of separator material having marginal portions adapted to project outwardly from the edges of said plates in said casing;
   (c) enclosing said first one of said sets of plates between layers of said separator material and adhesively securing the separator material to the interconnecting relatively narrow portions of the plates in said first one of said sets to form a sub-assembly of electrodes and separators;
   (d) sealing the marginal portions of said layers of separator material to one another to completely envelope the plates of said first one of said sets;
   (e) folding said sub-assembly and the set of plates of opposite polarity crosswise of the several relatively narrow portions thereof, and assembling both sets of electrode plates and said formed separator sheets to form a stack in which said sheets of separator material are interposed between the plates of opposite polarity.

References Cited in the file of this patent
UNITED STATES PATENTS

| | | |
|---|---|---|
| 2,851,509 | Di Pasquale et al. | Sept. 9, 1958 |
| 2,971,999 | Jacquier | Feb. 14, 1961 |